United States Patent
Wang et al.

(10) Patent No.: US 9,619,085 B2
(45) Date of Patent: Apr. 11, 2017

(54) PATTERN OF A CAPACITIVE TOUCH DEVICE AND MANUFACTURING METHOD THEREOF

(75) Inventors: Chi-Feng Wang, Wandan Towship (TW); Ching-Shan Lin, Shanshang Township (TW); Chien-Tai Chiu, Yongkang (TW)

(73) Assignee: TPK Touch Solutions (Xiamen) Inc., Xiamen (CN)

(*) Notice: Subject to any disclaimer, the term of this patent is extended or adjusted under 35 U.S.C. 154(b) by 9 days.

(21) Appl. No.: 13/541,768

(22) Filed: Jul. 5, 2012

(65) Prior Publication Data
US 2013/0093718 A1    Apr. 18, 2013

(30) Foreign Application Priority Data
Oct. 14, 2011 (CN) .......................... 2011 1 0317542

(51) Int. Cl.
*G06F 3/041*    (2006.01)
*G06F 3/044*    (2006.01)

(52) U.S. Cl.
CPC .... *G06F 3/044* (2013.01); *G06F 2203/04111* (2013.01); *Y10T 29/49105* (2015.01)

(58) Field of Classification Search
CPC .................. G06F 3/044; G06F 2203/04111
USPC ........................................................ 345/173
See application file for complete search history.

(56) References Cited

U.S. PATENT DOCUMENTS

| | | | | |
|---|---|---|---|---|
| 8,289,296 B2* | 10/2012 | Jeong et al. | ................... | 345/174 |
| 8,557,508 B2* | 10/2013 | Li et al. | ........................ | 430/319 |
| 8,729,910 B2* | 5/2014 | Meng | ...................... | G06F 3/044 |
| | | | | 324/658 |
| 2011/0069033 A1* | 3/2011 | Meng et al. | ................... | 345/174 |
| 2011/0134055 A1 | 6/2011 | Jung et al. | | |
| 2011/0207055 A1* | 8/2011 | Jun et al. | ....................... | 430/313 |
| 2011/0227839 A1* | 9/2011 | Rho et al. | ...................... | 345/173 |
| 2011/0234511 A1* | 9/2011 | Jeong et al. | .................. | 345/173 |

FOREIGN PATENT DOCUMENTS

| | | |
|---|---|---|
| CN | 101526869 A | 9/2009 |
| CN | 201465084 | 5/2010 |
| CN | 101840292 | 9/2010 |
| CN | 101957700 | 1/2011 |
| JP | 2011198341 | 10/2011 |
| KR | 944519 B1 | 3/2010 |
| KR | 101040846 | 6/2011 |

\* cited by examiner

*Primary Examiner* — Chanh Nguyen
*Assistant Examiner* — Yuzhen Shen
(74) *Attorney, Agent, or Firm* — Cooper Legal Group LLC (57) ABSTRACT

The present disclosure relates to a touch device, and more particularly to a pattern of a capacitive touch device and a manufacturing method thereof. The pattern of the capacitive touch device comprises of a substrate, two adjacent first axial electrodes, a first axial conductive wire, and a pair of metal jumpers. The first axial conductive wire is disposed between the two adjacent first axial electrodes for connecting the two adjacent first axial electrodes. The pair of metallic metal jumpers is disposed on the connecting points of the two first axial electrodes and the first axial conductive wire. Accordingly, resistance caused by the connecting points of the two adjacent first axial electrodes and the first axial conductive wire can be reduced such that response speed of the pattern of the capacitive touch control device is increased.

5 Claims, 8 Drawing Sheets

PATTERN OF A CAPACITIVE TOUCH DEVICE AND MANUFACTURING METHOD THEREOF

This application claims the benefit of Chinese application No. 201110317542.8, filed on Oct. 14, 2011.

TECHNICAL FIELD

This disclosure generally relates to a touch device, and more particularly to pattern of a capacitive touch device and a manufacturing method thereof.

DESCRIPTION OF THE PRIOR ART

With the rapid development of the electronic materials, touch devices have already become a commonly used input interface. Traditional input device, depending on pressure or manual operation, may also be replaced by a touch device in near future. More recently, due to prosperous development of liquid crystal panels, display screen integrated touch devices have already been produced and sold in large amounts. Touch devices can be divided into resistive touch devices and capacitive touch devices. Existing consumer electronic products have substantially taken advantage of capacitive touch devices and have integrated the capacitive devices with the display screens.

Figure 1:
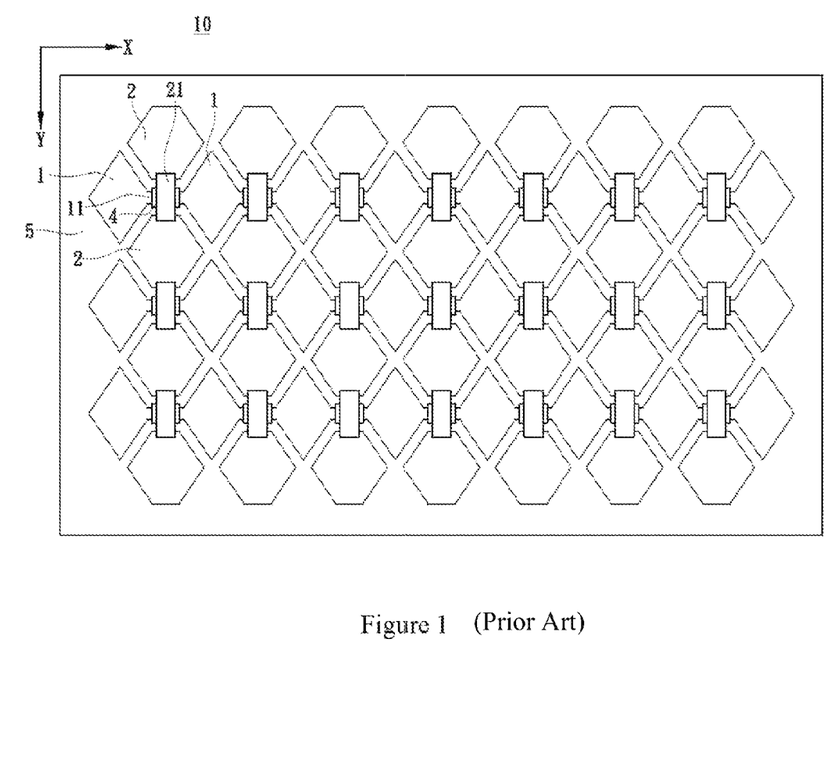
FIG. 1 shows a traditional touch device pattern.

Capacitive touch devices in integrated display screens usually have a coordinate-sensing capacity for two axial directions on the flat surface (X axis and Y axis). FIG. 1 illustrates a pattern of a traditional capacitive touch device. The pattern 10 of the capacitive touch device includes a substrate 5. Multiple groups of two adjacent first axial electrodes 1 and a first axial conductive wire 11 constitute sensor electrode units in the X axial direction, which are used for sensing X axial coordinates of touch positions. Multiple groups of two adjacent second axial electrodes 2 and a second axial conductive wire 21 constitute sensor electrode units in the Y axial direction, which are used for sensing Y axial coordinates of the touch positions. An insulating layer 4 is used for making the first axial conductive wire 11 and the second axial conductive wire 21 electrically insulated from each other. The above mentioned sensor electrode units can be made by transparent conductive materials such as Indium Tin Oxide. The insulating layer 4 usually is made of transparent insulating materials such as Polyimide.

Response speed of a capacitive touch device is restricted by resistance of the sensor electrode units in X axial direction and Y axial direction. Resistance of the sensor electrode units is mainly subject to an influence of neck formed by the transparent first axial conductive wire 11. Restricted to the pattern of the traditional capacitive touch devices, area of the first axial conductive wire 11 is usually smaller and at the same time possesses larger resistance. It is therefore a problem to reduce resistance in the neck and improve response speed of the capacitive touch devices.

SUMMARY OF THE INVENTION

An objective of the present disclosure is to provide a pattern of a capacitive touch device which can effectively reduce resistance of the touch device and enhance response speed of the touch device by setting a metal jumper across connection points of two adjacent first axial electrodes and a first axial conductive wire.

In an embodiment, pattern of a capacitive touch device comprises of:
two adjacent first axial electrodes;
a first axial conductive wire set between the two adjacent first axial electrodes to connect them; and
a pair of metal jumpers electrically connected to connection point of the two adjacent first axial electrodes and the first axial conductive wire.

Another objective of the present disclosure is to provide a manufacturing method for pattern of a capacitive touch device, which comprises of two adjacent first axial electrodes, a first axial conductive wire, and two adjacent second axial electrodes formed on surface of a substrate, wherein the first axial conductive wire is set between the two adjacent first axial electrodes to connect them, and the two adjacent second axial electrodes are disposed separately on two lateral sides of the first axial conductive wire. Further, an insulating layer which covers part of the first axial conductive wire is formed. Next, a pair of metal jumpers and a second axial conductive wire is formed, wherein the pair of metal jumpers is placed on connection point between the two adjacent first axial electrodes and the first axial conductive wire. Further, the second axial conductive wire is placed across the insulating layer and connected to the two adjacent second axial electrodes making the first axial conductive wire and the second axial conductive wire electrically insulated.

Another objective of the present disclosure is to provide a manufacturing method of a pattern of a capacitive touch device comprising of: forming a pair of metal jumpers and forming a second axial conductive wire on a substrate, wherein the pair of metal jumpers are disposed separately on both lateral sides of the second axial conductive wire. Further, the second axial conductive wire is covered by an insulating layer. Next, the two adjacent first axial electrodes, the first axial conductive wire, and the two adjacent second axial electrodes are formed on the substrate, wherein the two adjacent second axial electrodes are connected separately to both ends of the second axial conductive wire. The two adjacent first axial electrodes are disposed separately on two lateral sides of the second axial conductive wire, wherein the first axial conductive wire is covered partially with the insulating layer, further wherein the pair of metal jumpers is also covered. The first axial conductive wire is connected to the two adjacent first axial electrodes. Formation of the insulating layer between the first axial conductive wire and the second axial conductive wire results in electrical insulation.

Summarized from the above, the pattern of the capacitive touch device provided in the disclosure can effectively reduce the resistance caused by connection of the two adjacent first axial electrodes and the first axial conductive wire; thereby enhancing response speed of the capacitive touch device. During manufacturing process, etching is necessary to finish a pair of metal jumpers and a second axial conductive wire, and also to decrease the extra production cost.

DETAILED DESCRIPTION OF THE PREFERRED EMBODIMENTS

For those skilled in the art, embodiments and drawings described below are for illustration purposes only and do not limit the scope of the present disclosure in any manner.

Figure 2:
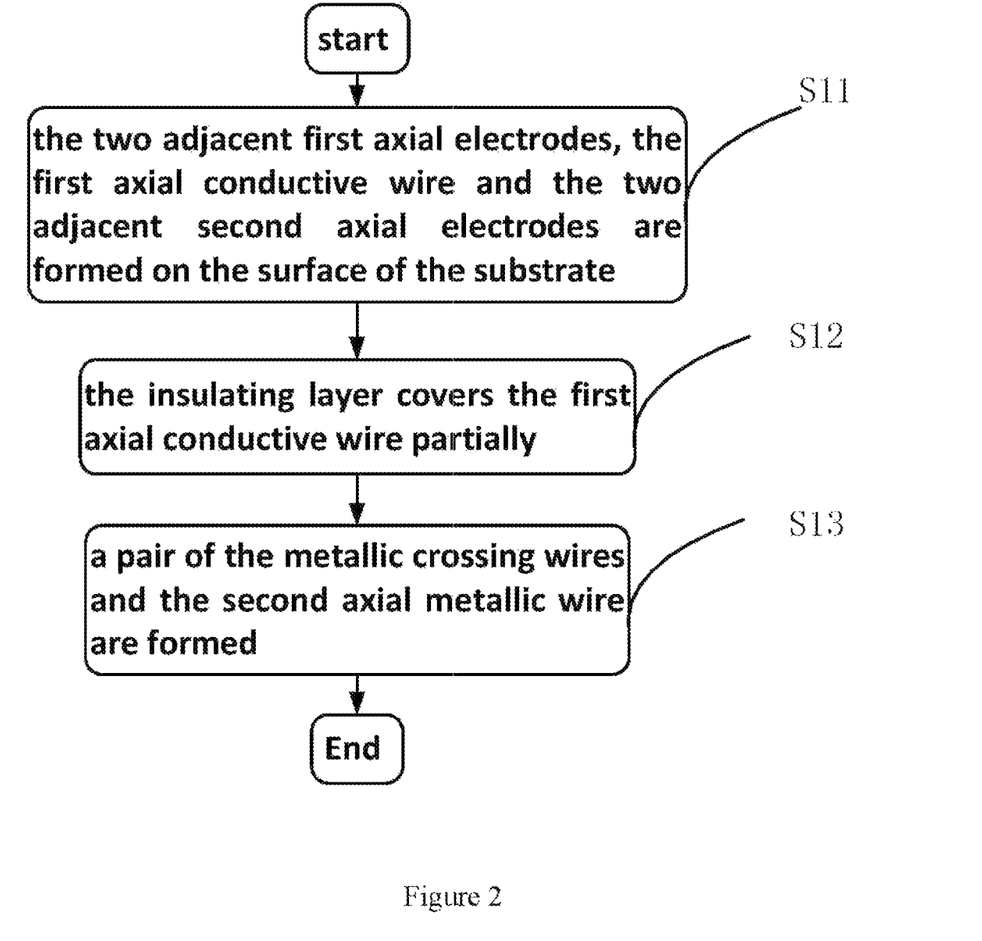
FIG. 2 shows flowchart of a manufacturing method of a touch device pattern in accordance with an embodiment of the present disclosure.
Figure 3:
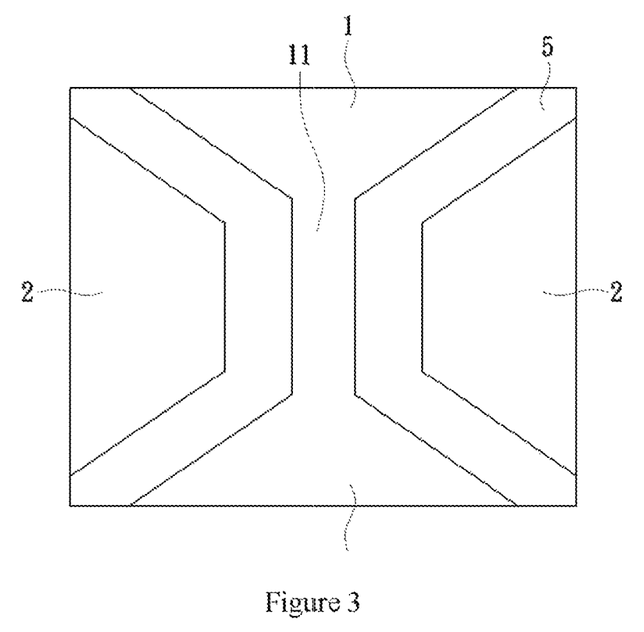
FIG. 3-FIG. 5 illustrate structures corresponding to various steps in the manufacturing method of the touch device pattern in accordance with the embodiment of the present disclosure.
Figure 4:
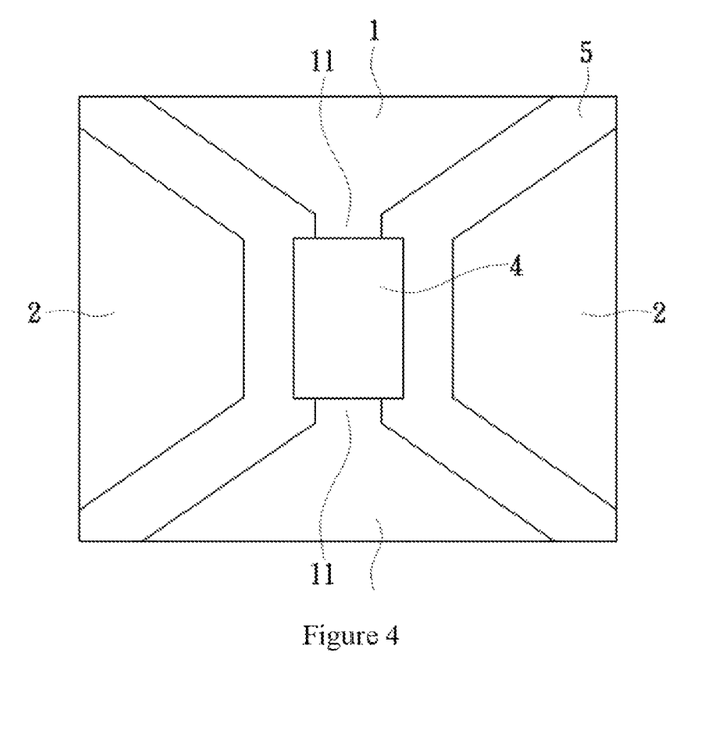
Figure 5:
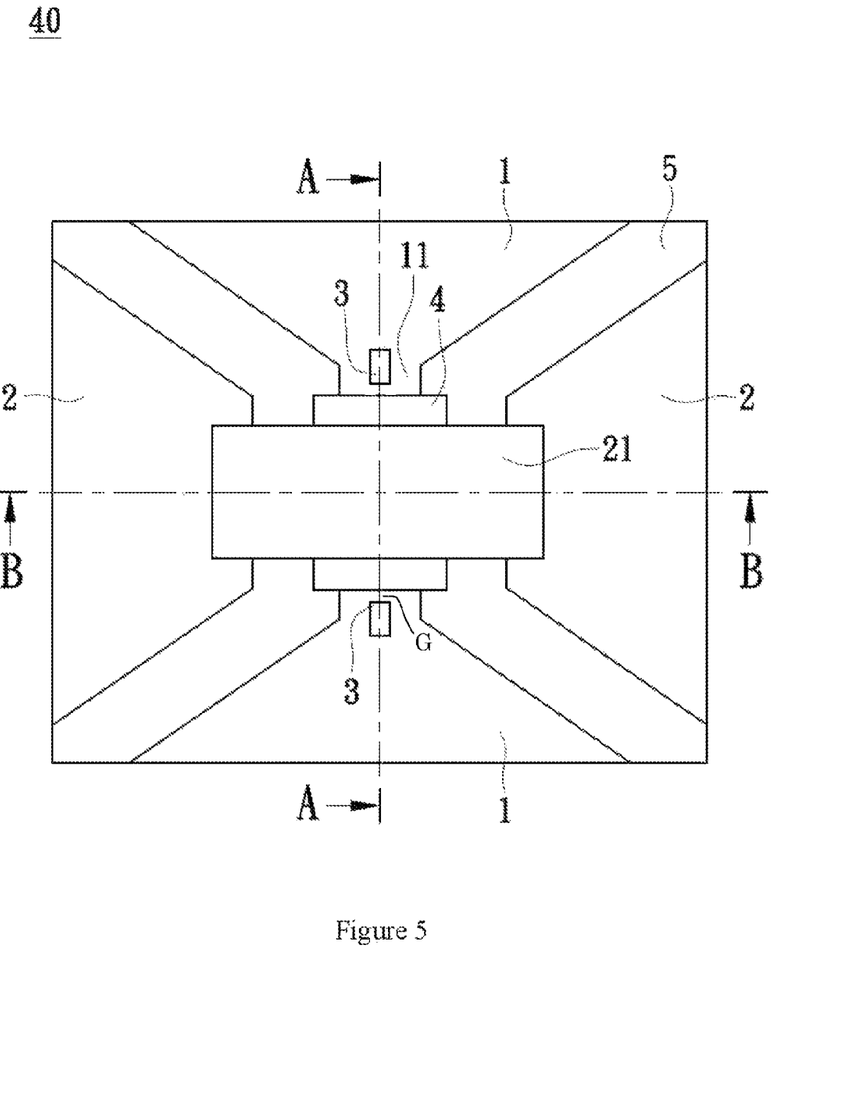

FIG. 2 shows flowchart of a manufacturing method of a pattern of a touch device. FIGS. 3, 4 and 5 are planar figures of patterns produced by the steps in the manufacturing method of FIG. 2. The manufacturing method of patterns of a touch device can either be a yellow-light process or can use a circuit-printing technique. The manufacturing method of the pattern of the touch device of the present disclosure comprises;

Step S11: forming two adjacent first axial electrodes 1, a first axial conductive wire 11, and two adjacent second axial electrodes 2 on surface of a substrate 5. As shown in FIG. 3, the first axial conductive wire 11 is set between the two adjacent first axial electrodes 1 to link them together. The two adjacent second axial electrodes 2 are disposed separately on two lateral sides of the first axial conductive wire 11. The two adjacent first axial electrodes 1, the first axial conductive wire 11, and the two adjacent second axial electrodes 2 can be made from transparent conductive materials. The transparent conductive materials have properties of visible light transparency and conductivity. The transparent conductive materials can include Indium Tin Oxide, but even other types of transparent conductive materials, not listed here to avoid limitation of disclosure, can also be used. The first axial electrodes 1 and the first axial conductive wire 11 can be a structure of integral molding.

Step S12: covering the first axial conductive wire 11 by an insulating layer 4 as shown in FIG. 4. The insulating layer 4 can be made by transparent insulating materials such as Polyimide, but the types of transparent insulating materials are not listed to avoid the limitation of the disclosure.

Step S13: forming a pair of metal jumpers 3 and a second axial conductive wire 21 as shown in FIG. 5. This pair of metal jumpers 3 is placed on a connection point of two adjacent first axial electrodes 1 and the first axial conductive wire 11. The second axial conductive wire 21 across the insulating layer 4 is connected to the two adjacent second axial electrodes 2 making an electrical insulation between the first axial conductive wire 11 and the second axial conductive wire 21. Pattern 40 of the touch device in FIG. 5 can be formed through steps S11-S13.

In pattern 40 of the capacitive touch device in FIG. 5, the first axial conductive wire 11 is narrow and lengthy, and is made of a transparent conductive material, making resistance between the two adjacent first axial electrodes 1 relatively high. However, after the pair of metal jumpers 3 is disposed on the connection point between the two adjacent first axial electrodes 1 and the first axial conductive wire 11, resistance between the two adjacent first axial electrodes 1 can be reduced and the sensing speed of the integral touch device can be enhanced.

Pattern 40 of the capacitive touch device can further be connected to an outer controlling unit via peripheral lines with favorable conductivity (not given in FIG. 1-FIG. 4) after completion of the pattern 40 of the touch device. For illustration, first axial peripheral lines (not given in FIG. 1-FIG. 4) and second axial peripheral lines (not given in FIG. 2-FIG. 5) are formed on two adjacent lateral sides of the substrate 5 so as to connect the first axial peripheral line with the first axial electrode 1 and connect the second axial peripheral line with the second axial electrode 2.

Figure 6:
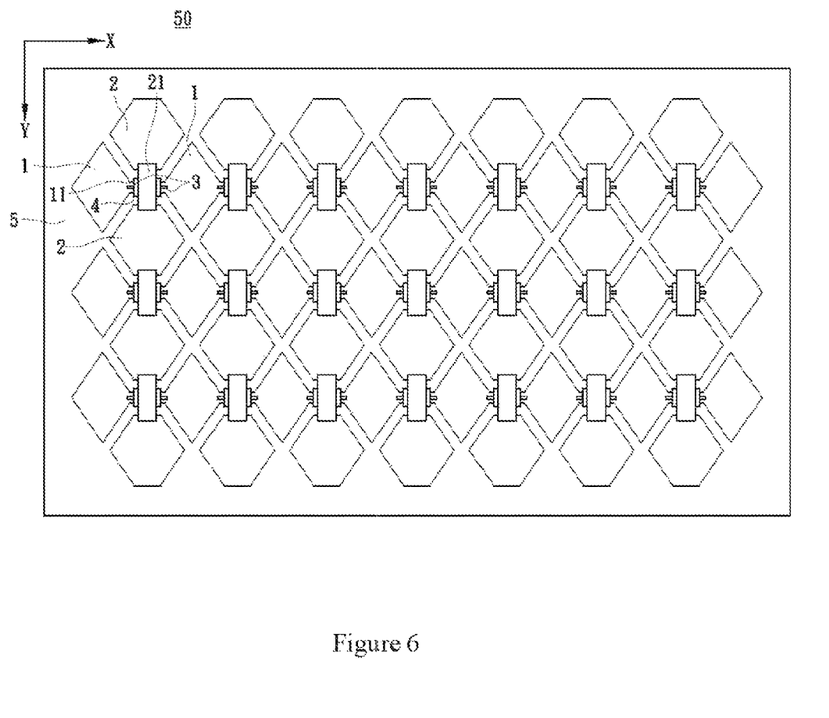
FIG. 6 is illustrates a schematic diagram of the touch device pattern in accordance with the embodiment of the present disclosure.

FIG. 6 is a planar view of the pattern of the capacitive touch device in accordance with the present embodiment. Pattern 50 of the touch device is formed by arranging the pattern 40 of the touch device in arrays in FIG. 5. The pattern 40 of the touch device can be finished using the method of the touch device pattern described in the following embodiment.

Figure 7A:
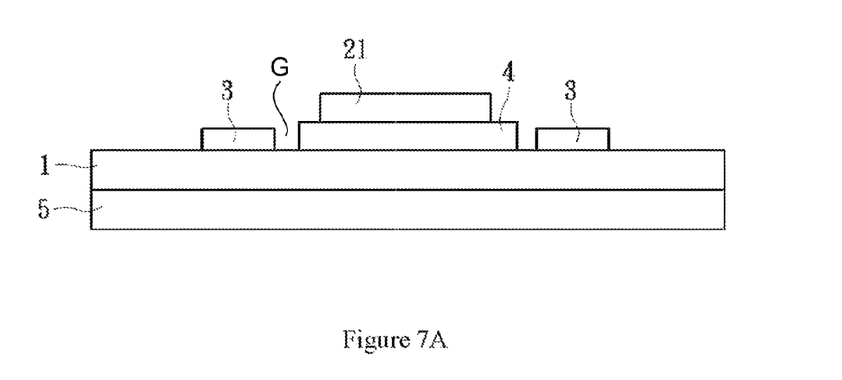
FIG. 7A is a cross-sectional figure of a touch device pattern along A axis.
Figure 7B:
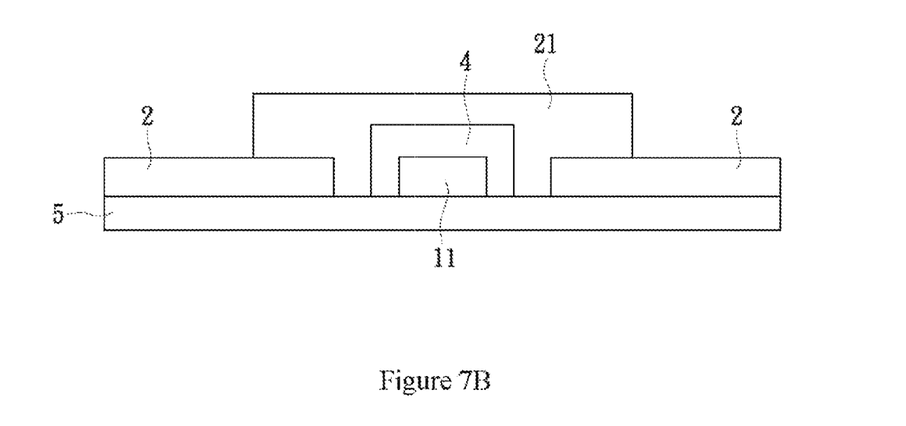
FIG. 7B is a cross-sectional figure of a touch device pattern along B axis.

FIG. 7A shows a cross-sectional view of the pattern 40 of the touch device alongside A axis. FIG. 7B is a cross-sectional view of the pattern 40 of the touch device alongside B axis. In an embodiment, pattern 40 of a touch device includes a substrate 5, two adjacent first axial electrodes 1, a first axial conductive wire 11, two adjacent second axial electrodes 2, a second axial conductive wire 21, an insulating layer 4, and a pair of metal jumpers 3. The two adjacent first axial electrodes 1, the first axial conductive wire 11, and the two adjacent second axial electrodes 2 are placed on surface of the substrate 5. The first axial conductive wire 11 is formed between the two adjacent first axial electrodes 1 so as to connect them. The two adjacent second axial electrodes 2 are disposed separately on two lateral sides of the first axial conductive wire 11. The second axial conductive wire 21 stretches across the first axial conductive wire 11 and is connected to the two adjacent second axial electrodes 2. The insulating layer 4 is formed between the transparent first axial conductive wire 11 and the second axial conductive wire 21 so as to make them electrically insulated. The pair of metal jumpers 3 is placed on the connection point between the two adjacent first axial electrodes 1 and the first axial conductive wire 11.

Referring to FIG. 5 and FIG. 6, multiple groups of the two adjacent first axial electrodes 1 and the first axial conductive wire 11 constitute sensor electrode units in X axial direction. The sensor electrode units are used for sensing X axial coordinates of touch positions. Multiple groups of two adjacent transparent second axial electrodes 2 and the second axial conductive wire 21 constitute sensor electrode units in Y axial direction, which are used for sensing Y axial coordinates of the touch positions. The two adjacent transparent second axial electrodes 2 are composed of transparent conductive materials such as ITO. The second axial conductive wire 21 can be a metallic film composed of molybdenum/aluminum/molybdenum or any other metal with good conductivity. The metallic film of molybdenum/aluminum/molybdenum is suitable being used in the etching process to finish the second axial conductive wire 21.

The insulating layer 4 is formed between the transparent first axial conductive wire 11 and the second axial conductive wire 21. Based on width of the second axial conductive wire 21, an insulating layer with a proper area can be selected so that appropriate electrical insulation can be made between the first axial conductive wire 11 and the second axial conductive wire 21. The insulating layer 4 can be made of a Polyimide or any other compatible/well known material.

A pair of metal jumpers 3 is used for reducing resistance of the electrode units in X axial direction constituted by the transparent first axial electrode 1 and the transparent first axial conductive wire 11. The pair of metal jumpers 3 can be located near the connection point of the two adjacent first axial electrodes 1 and the first conductive wire 11. As shown in FIG. 5 and FIG. 7A, a gap C is formed between the metal jumper 3 and the insulating layer 4. The first, axial conductive wire 11 has relatively a small cross section compared to that of the first axial electrode 1, which makes resistance of neck, which includes the two adjacent first axial electrodes 1 and the first axial conductive wire 11, larger. This increases resistance of the electrode units of the X axial direction constituted by the first axial electrode 1 and the transparent first axial conductive wire 11.

Resistance of electrode units of X axial direction that comprise of the first axial electrode 1 and of the transparent conductive wire 11 can be reduced via a pair of metallic conductive wires 3. Reduction of this resistance can shorten the response time of the touch device, thereby enhancing response speed of the touch device. A method to calculate resistance of the X axial electrode units is mentioned herein. When value of the first axial electrodes 1 is represented by N, then N−1 represents the number of the first axial conductive wires 11. Resistance of the electrode units of the X axial direction represents resistance acquired from serial wounding of the first axial electrode 1 and the first axial conductive wire 11. In other words, resistance of the electrode units of the X axial direction is the resistance of the first axial electrode 1 multiplied by number of the first axial electrodes 1 and then next adding resistance of the neck, which constitutes the two adjacent first axial electrodes and the first axial conductive wire 11, and then finally multiplying the number of the necks.

Illustratively, resistance of each first axial electrode 1 is 100Ω, and the resistance of each individual neck is 200 g. When N is 11, resistance of the electrode units of the X axial direction is equivalent to 3100 Ω (11×100+10×200=3100Ω). Assuming that after adding a pair of metallic conductive wires 3, resistance of the neck becomes 10Ω. Then, resistance of the electrode units of the X axial direction is equivalent to 1200Ω (11×100+10×10=1200Ω).

A pair of metal jumpers 3 can comprise of any metallic conductive wire, and more specifically a metallic film that comprises of molybdenum, aluminum, or molybdenum. Using an etching process, the pair of metal jumpers 3 and the second axial conductive wire 21 can be finished.

Figure 8:
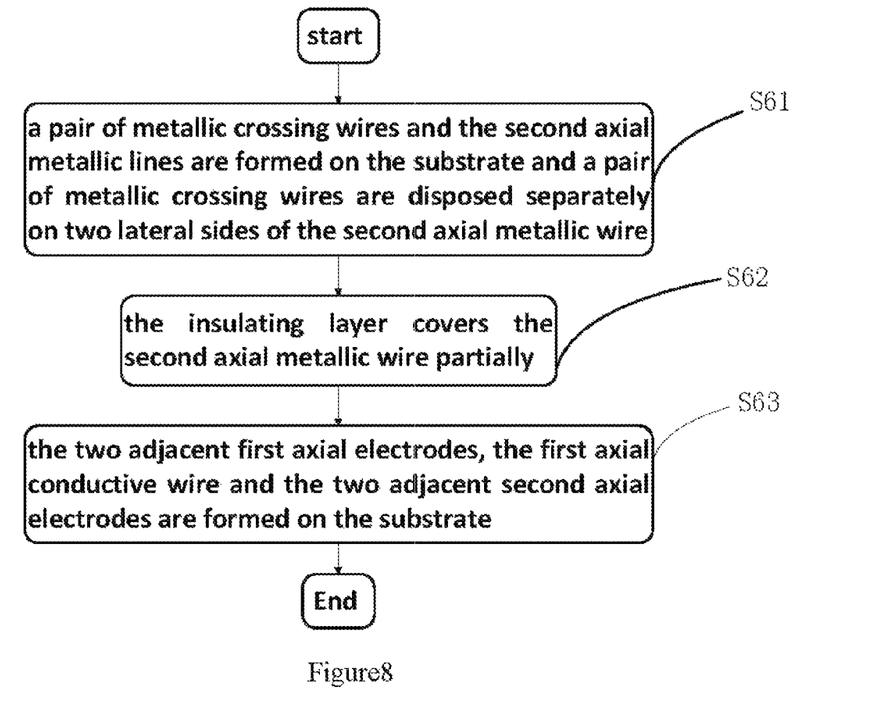
FIG. 8 shows a flowchart of a manufacturing method of a touch device pattern.
Figure 9:
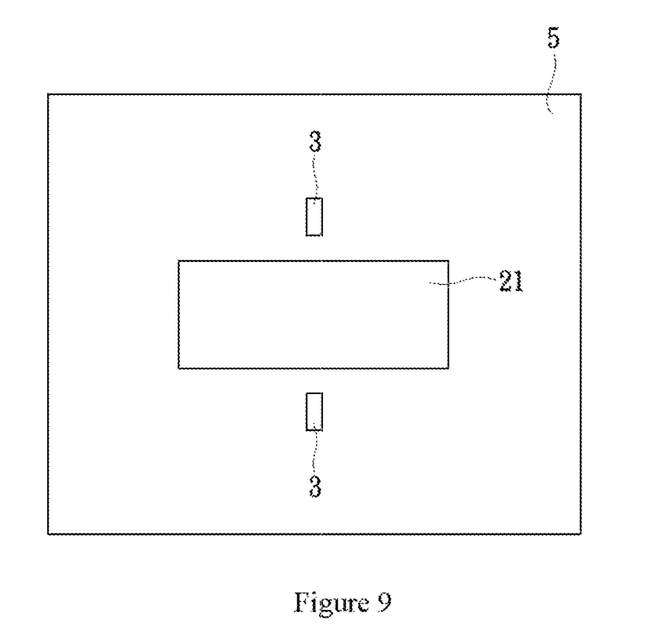
FIG. 9-FIG. 11 are schematic diagrams of structures corresponding to various steps in the manufacturing method of the touch device pattern.
Figure 10:
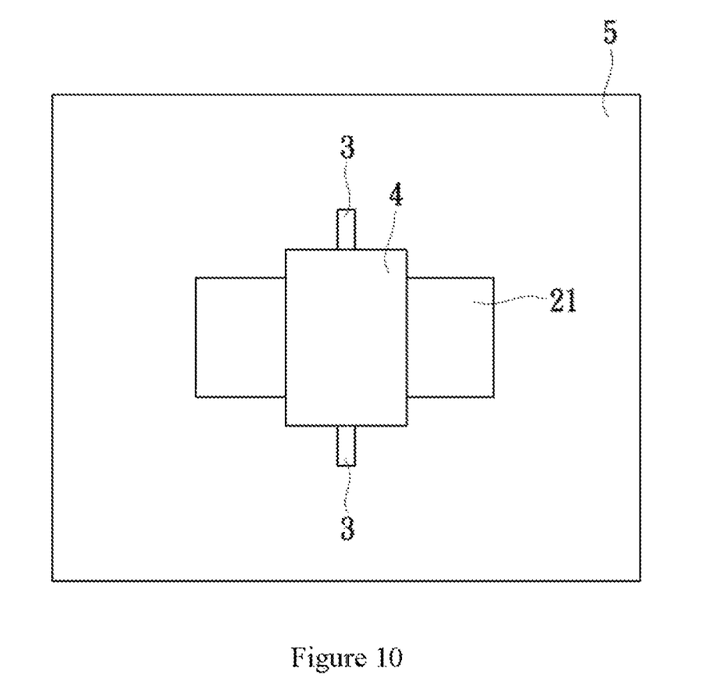
Figure 11:
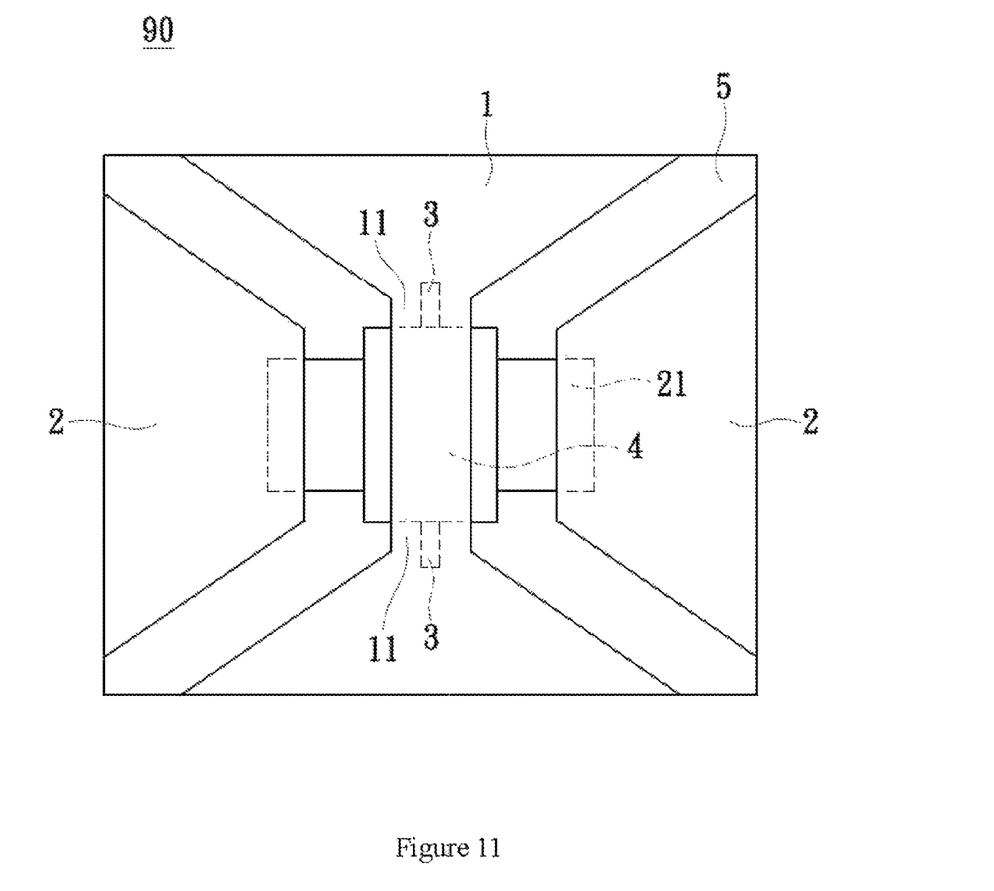

FIG. 8 shows flowchart of a manufacturing method of the touch device pattern. FIG. 9-FIG. 11 are schematic diagrams of structures corresponding to various steps in the manufacturing method of the touch device pattern. The manufacturing method of the touch device pattern can be a yellow-light process or a circuit-printing technique. As shown in FIG. 11, the touch device pattern 90, produced in the manufacturing method of the touch device pattern, has structure of an adverse superposition of the touch device pattern 40. The manufacturing method of the touch device pattern comprises;

Step S61: forming a pair of metal jumpers 3 and a second axial conductive wire 21 on a substrate 5, wherein the pair of metal jumpers 3 is disposed separately on two lateral sides of the second axial conductive wire 21, as shown in FIG. 9. The pair of metal jumpers 3 and the second axial conductive wire 21 can be made of a metallic film of molybdenum/aluminum/molybdenum.

Step S62: covering the second axial conductive wire 21 by an insulating layer 4, as shown in FIG. 10. The insulating layer 4 can be a Polyimide, but the disclosure is not confined to this.

Step S63: forming two adjacent first axial electrodes 1, a first axial conductive wire 11, and two adjacent second axial electrodes 2 on a substrate 50. As shown in FIG. 11, the two adjacent second axial electrodes 2 are connected to both ends of the second axial conductive wire 21. The two adjacent first axial electrodes 1 are disposed separately on two lateral sides of the second axial conductive wire 21. The first axial conductive wire 11 is covered partially over the insulating layer 4 and partially over the pair of metal jumpers 3. The first axial conductive wire 11 is connected to the two adjacent first axial electrodes 1. The insulating layer 4 positioned between the first axial conductive wire 11 and the second axial conductive wire 21 makes the wires 11 and 21 electrically insulated. The two adjacent first axial electrodes 1, the first axial conductive wire 11, and the two adjacent second axial electrodes 2 can be made of Indium Tin Oxide. The touch control circuit pattern 90 is formed via steps S61-S63.

In accordance with the embodiments, touch device pattern of the present disclosure and its manufacturing method reduces resistance caused by a neck, which comprises of two adjacent first axial electrodes and a first axial conductive wire, thereby enhancing response speed of the touch device pattern.

What is claimed is:

1. A manufacturing method of a pattern of a capacitive touch device comprising the steps of:
    step 1; forming two adjacent first axial electrodes, a first axial conductive wire, and two adjacent second axial electrodes on a surface of a substrate, wherein the first axial conductive wire is connected between the two adjacent first axial electrodes, further wherein the two adjacent second axial electrode are disposed separately on two lateral sides of the first axial conductive wire;
    step 2: forming an insulating layer to partially cover the first axial conductive wire; and
    step 3: forming a pair of jumpers on connection points between the first axial electrodes and the first axial conductive wire, wherein the pair of jumpers are exposed from the first axial electrodes and the second axial electrodes; and forming a second axial conductive wire on the insulating layer, wherein a gap is defined between the jumpers and the insulating layer, and wherein the jumpers area made of a material different than that of the first axial electrodes and the first axial conductive wire, and wherein the jumpers and the second axial conductive wire comprise at least one metal material, and the first axial electrodes and the first axial conductive wire comprise a transparent metal oxide material.

2. The manufacturing method of claim 1, wherein the second axial conductive wire stretches across the insulating layer and connects the two adjacent second axial electrodes and wherein the second axial conductive wire is electrically insulated from the first axial conductive wire.

3. The manufacturing method of claim 1, further comprising:
    forming a first axial peripheral line and a second axial peripheral line on sides of a substrate, wherein the first axial peripheral line is connected to the first axial electrodes and the second axial peripheral line is connected to the second axial electrodes.

4. The manufacturing method of claim 1, wherein the step 1 further comprises forming the first axial electrodes and the first axial conductive wire by an integral molding method.

5. The manufacturing method of claim 1, wherein the step 3 further comprises forming the jumpers and the second axial conductive wire by an etching process.

* * * * *